United States Patent [19]

Amacher et al.

[11] Patent Number: 4,760,539

[45] Date of Patent: * Jul. 26, 1988

[54] METHOD OF CALIBRATING A WEIGHING APPARATUS

[75] Inventors: Gene L. Amacher, Cambridge; Gene R. Mathes, Zanesville; John F. Paugstat, Salesville, all of Ohio

[73] Assignee: NCR Corporation, Dayton, Ohio

[*] Notice: The portion of the term of this patent subsequent to Apr. 28, 2004 has been disclaimed.

[21] Appl. No.: 868,925

[22] Filed: May 27, 1986

[51] Int. Cl.⁴ .................... G01C 25/00; G01G 19/04
[52] U.S. Cl. .................................. 364/571; 73/1 R; 177/3; 177/25; 340/666; 364/567
[58] Field of Search ............... 364/466, 567, 571, 575, 364/709; 177/1, 3, 25.13, 25.19, 50; 73/1 R; 340/666

[56] References Cited

U.S. PATENT DOCUMENTS

| | | | |
|---|---|---|---|
| 3,860,802 | 1/1975 | Knothe et al. | 364/567 |
| 3,976,975 | 8/1976 | Cochran | 364/709 |
| 4,139,069 | 2/1979 | Domis et al. | 177/1 |
| 4,316,516 | 2/1982 | Kupper | 177/25.14 |
| 4,412,298 | 10/1983 | Feinland et al. | 364/567 |
| 4,423,486 | 12/1983 | Berner | 364/466 |
| 4,509,608 | 4/1985 | Hikita | 177/1 |
| 4,512,429 | 4/1985 | Meier | 177/25 |
| 4,535,854 | 8/1985 | Gard et al. | 177/1 |
| 4,572,309 | 2/1986 | Nishiyama | 177/50 |
| 4,660,663 | 4/1987 | Amacher et al. | 364/567 |

FOREIGN PATENT DOCUMENTS

0131461 1/1985 European Pat. Off. .

Primary Examiner—Parshotam S. Lall
Assistant Examiner—Kevin J. Teska
Attorney, Agent, or Firm—Wilbert Hawk, Jr.; Albert L. Sessler, Jr.; Richard W. Lavin

[57] ABSTRACT

A method for calibrating an electronic scale includes sampling the output of the scale a predetermined number of times to generate a number of average readings for the weight that is placed on the scale, comparing two successive average readings and selecting the average reading that is within a predetermined weight of the previous average reading, comparing the digital signals sampled representing the selected average reading with the setting of a plurality of settable switches in which each switch position will represent a binary bit and displaying on a display the switch settings which represents the selected average reading of the output of the scale. The operator in response to instructions displayed on the display will place a weighted object on the scale, set one of the switches of the settable switches in response to placing the weight on the scale and set the switches in response to the instructions displayed on the display to store the selected average reading in the settable switches. The method is repeated for a second weight.

13 Claims, 10 Drawing Sheets

NOTE:
X - RECORDED OUTPUT FOR 0.00 LBS/KGS
Y - RECORDED OUTPUT FOR 30.00 LBS/15.00 KGS
$X_i$ SCALE OUTPUT FOR A GIVEN WEIGHT $$\text{NET WEIGHT} = \frac{X_i - Y}{Y - X}$$

X,Y - MAJOR SCALE PARAMETERS

METHOD OF CALIBRATING A WEIGHING APPARATUS

CROSS-REFERENCE TO RELATED APPLICATIONS

Method of Calibrating a Weighing Apparatus Within an Enclosure, U.S. Pat. No. 4,660,663 issued Apr. 28, 1987, invented by Gene L. Amacher, Gene R. Mathes and John F. Paugstat, assigned to the NCR Corporation.

Automatic Zero Balancing of a Weighing Apparatus, co-pending application, Ser. No. 868,926 filed on May 27, 1986, invented by Gene L. Amacher, Gene R. Mathes and John F. Paugstat, assigned to the NCR Corporation.

Method of Fast Weighing, U.S. Pat. No. 4,715,457, issued Dec. 29, 1987, invented by Gene L. Amacher, Gene R. Mathes and John L. Paugstat, assigned to the NCR Corporation.

Method for Controlling Terminal Display Indication, U.S. Pat. No. 4,660,673 issued Dec. 29, 1987, invented by Gene L. Amacher, Gene R. Mathes and John F. Paugstat, assigned to the NCR Corporation.

BACKGROUND OF THE INVENTION

The present invention is directed to weight measuring apparatus and more particularly to a method for calibrating a weighing scale so as to meet Federal standards concerning the accuracy of the scale for measuring weights placed on the scale.

Weighing scales are found in supermarkets or the like for weighing produce or other merchandise items and must meet stringent requirements as to performance and cost. The scales must be accurate enough to satisfy public weights and measures authorities. These requirements are usually met at the time the scale is manufactured by means of a calibrating procedure. When through use, the scale becomes disabled and must be recalibrated, the calibrations sequence occurs under the supervision of an authorized serviceman at the business location where the scale is being used. Prior methods for calibrating a scale have consisted of a trial and error procedure which required the continuous setting of a plurality of switches by a serviceman until the scale was calibrated. This procedure was slow and cumbersome thereby increasing the down time of the scale which was costly to the owner of the scale.

It is therefore a principal object of this invention to provide a method for calibrating a weighing scale which is simple in its operation and can be accomplished in a minimum amount of time.

SUMMARY OF THE INVENTION

This and other objects of the invention are fulfilled in a system for weighing a weighted item which includes a scale for outputting digital signals representing the weighted item, a processor, a plurality of settable switches settable to a position representing digital signals and a display connected to the processor, a method for calibrating the scale comprising the steps of setting the switches to a first position, applying power to the system, displaying instructions to place a first weighted item on the scale, placing the weighted item on the scale, sampling the output of the scale to identify the digital signals representing the weight of the first weighted item, displaying on the display instructions identifying the setting of the switches to represent the digital signals sampled and setting the switches to the position in accordance with the instructions displayed.

BRIEF DESCRIPTION OF THE DRAWINGS

The foregoing and other objects, advantages, and features of the invention will be described in greater detail, taken in conjunction with the drawings wherein.

DESCRIPTION OF THE PREFERRED EMBODIMENT

Figure 1:
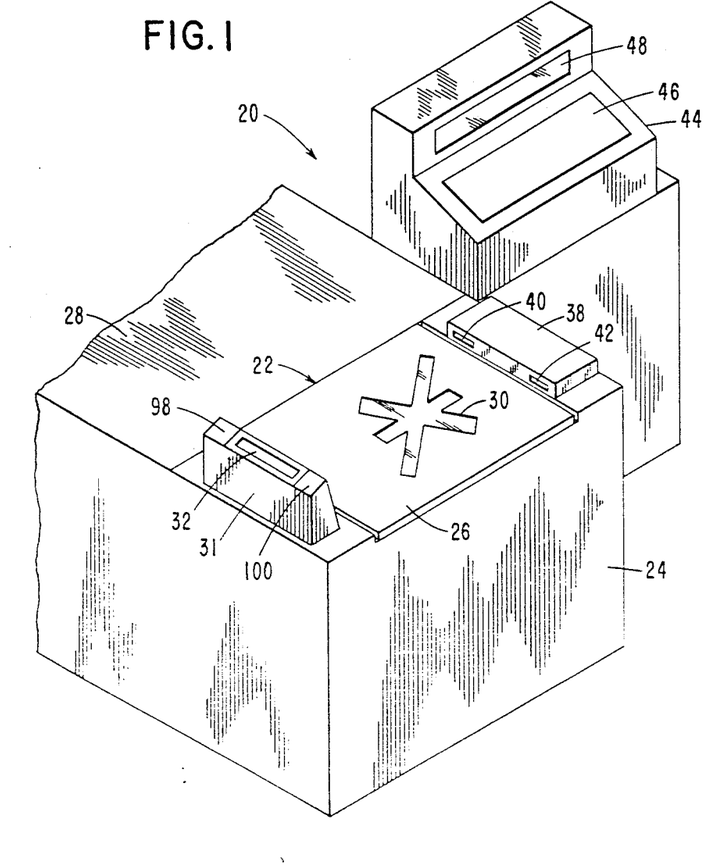
FIG. 1 is a perspective view of a check-out system which includes a scale for weighing purchased merchandise items.
Figure 6:
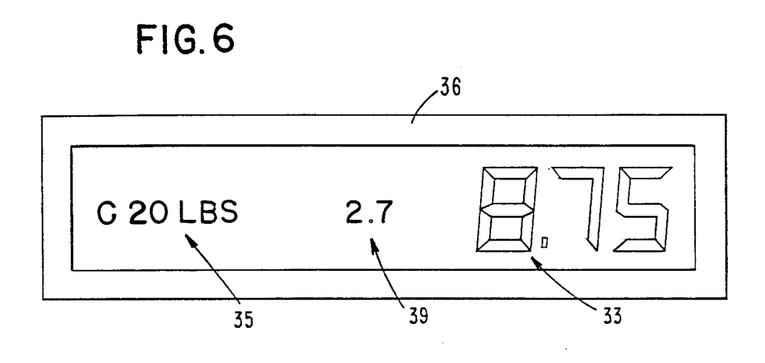
FIG. 6 is a plan view of the customer display showing the display of price information of a scanned merchandise item and instructions for placing a predetermined weight on the scale and the setting of the switches to be set.
Figure 7:
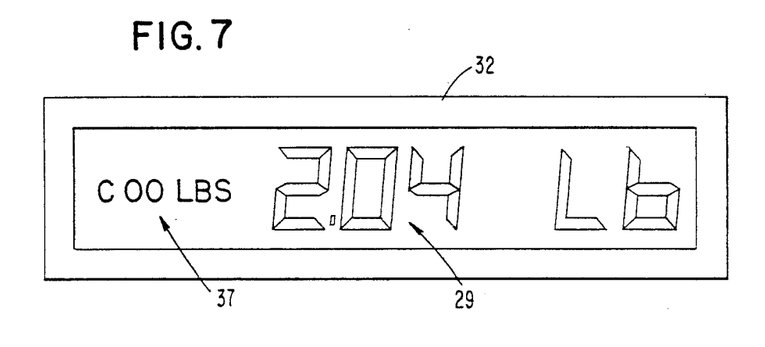
FIG. 7 is a plan view of the customer display showing the display of the weight of a purchased item and instructions for placing a predetermined weight on the scale.

Referring now to FIG. 1, there is shown a perspective view of a merchandise check-out system generally indicated by the numeral 20 in which a scale 22 is utilized to weigh a purchase item. The scale is located within a check-out counter 24 and includes a scale lid or load plate 26 movably mounted flush with the top surface 28 of the check out counter 24. The scale lid 26 includes an aperture 30 through which scanning beams from a scanner assembly 36 (FIG. 2), mounted beneath the scale within the check-out counter, are projected for scanning a bar code label (not shown) on a merchandise item positioned on the scale lid 26 in a manner that is well known in the art. Mounted adjacent the scale lid 26 on the surface 28 of the check-out counter 24 is a housing member 31 in which is located a customer display 32 which displays the price 33 (FIG. 6) of the merchandise item scanned and also the weight 29 (FIG. 7) of the item as the result of a weighing operation. Located adjacent on either side of the display 32 within the housing 31 are a pair of signal lights 98, 100 one red and one green, which are operated to indicate whether a weighing operation or a scanning operation was successful or not. Opposite the housing 31 on the surface 28 of the counter 24, is a housing 38 in which is located a pair of photo-electric cells 40, 42 which detects the entrance and the exit of the merchandise item on the lid 26. A pair of light emitting diodes (not shown) located in the housing member 31 directs light beams at the cells 40 and 42 in a manner that is well known in the art. Mounted adjacent the check-out counter 24 is a data terminal device 44 for processing the sales transaction and includes a keyboard 46 and a display 48. The display 32 is an alphanumeric LCD display and can be operated automatically or by the manual operation of a key on the keyboard 46.

Figure 2:
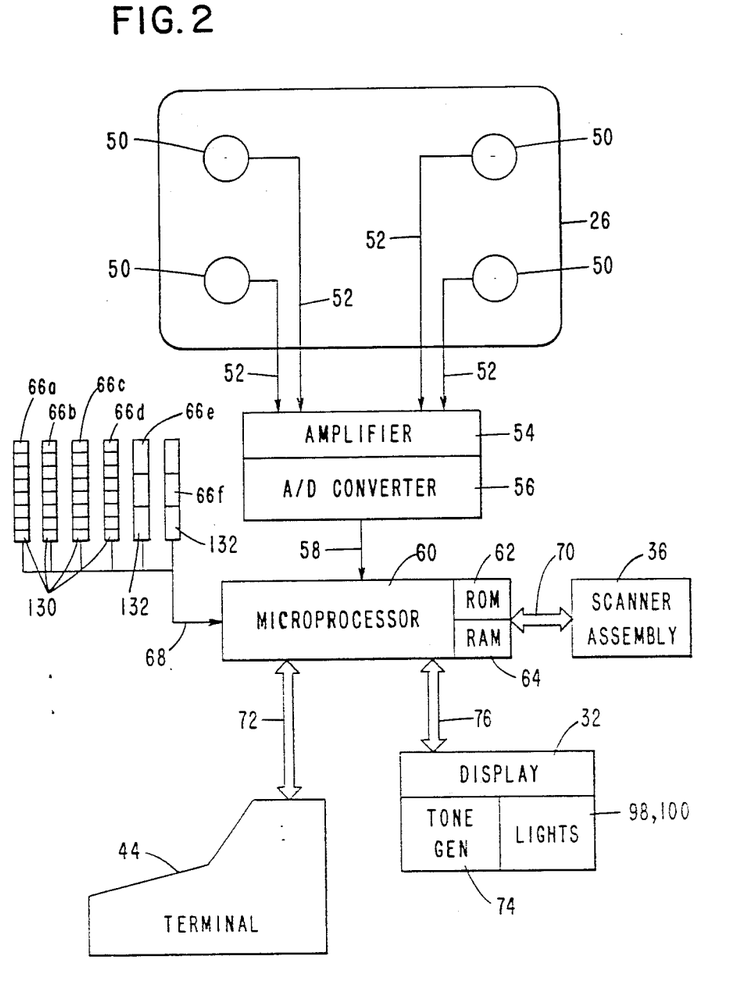
FIG. 2 is a schematic representation of the check-out system of FIG. 1 in which the scale microprocessor is used in the calibration of the scale.

Referring now to FIG. 2, there is shown a schematic representation of the check-out system 20 (FIG. 1) in which the scale 22 includes four load cells 50 secured to the scale lid 26 and which output analog signals over lines 52 to an amplifier 54 in response to the placing of a weighted item on the lid 26. The amplified analog signals are then transmitted to a A/D converter 56 which outputs digital signals over line 58 to a microprocessor 60. The microprocessor includes a ROM memory unit 62 in which is stored the program for calibrating the scale 22 and a RAM memory unit 64 in which data used in calibrating the scale is stored as will be described more fully hereinafter. The microprocessor 60 is connected to six banks of switches 66a–66f inclusive over cable 68; to the scanner assembly 36 over bus 70, to the terminal 44, over bus 72; and to the display 32, the signal lights 98, 100 and to a tone generator 74 over bus 76. The microprocessor 60 monitors the operation of the scanner assembly 36 over bus 70. When the scanner is in operation, the microprocessor 60 controls the display 32 to display the item price or total sale (FIG. 6) in response to data received from the terminal 44. The microprocessor 60 will also control the display 32 to display the item weight (FIG. 7) in response to a scale operation. The microprocessor 60 further controls the signal lights 98, 100 and the tone generator 74 in response to the operation of the scanner and the scale indicating a valid or invalid operation as will be explained more fully hereinafter.

Figure 3:
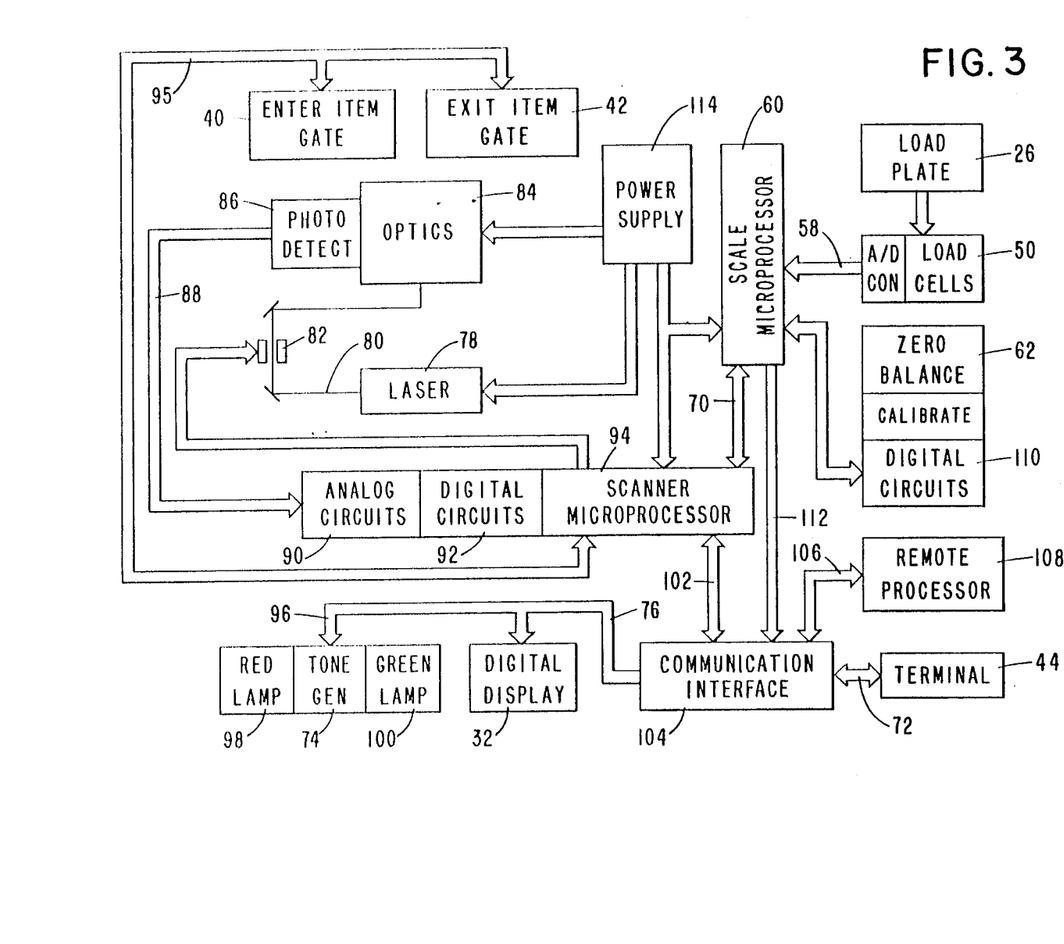
FIG. 3 is a functional block diagram of the check-out system of FIG. 1.

Referring now to FIG. 3, there is disclosed a more detailed functional block diagram of the checkout system 20 in which the scanner assembly 36 (FIG. 2) includes a laser light 78 which outputs a light beam 80 through a shutter assembly 82 to a rotating optical assembly 84 which in turn directs the reflected light beams through the aperture 30 (FIG. 1) in the scale lid 26. The scanning light beam scans the bar code label on a merchandise item positioned on the lid 26. The light beams are then reflected from the bar code label back through the aperture 30 to a photo detector 86 which outputs an analog signal representing the coded data read over the bus 88 to the analog circuit section 90 where the signals are amplified and transferred to the digital circuit section 92. The digital circuit section 92 converts the analog signals to digital data signals. The data signals are then transferred to a scanner microprocessor 94. The microprocessor 94 will also receive signals over bus 95 from the enter item gate 40 and the exit item gate 42 indicating the presence of a merchandise item. In response to receiving the signals from the item gate 40, the microprocessor operates the shutter assembly 82 allowing the laser beam to scan the merchandise item. A signal from the exit item gate 42 turns off the shutter assembly.

The microprocessor 94 using the data received determines whether a good or bad read operation has occurred. If a bad read operation has occurred, the microprocessor 94 will output a control signal over bus 70 to the microprocessor 60 which operates the red lamp 98 by transmitting the appropriate signals over bus 112, a communication interface 104 and bus 76 to the lamp 98. The red lamp 98, indicates to the operator that the merchandise item should be rescanned. If a good read has occurred, a green lamp 100, which is also part of the signal lights 34, is illuminated and the tone generator 74 is operated to output a sound signal indicating to the operator that a good read has occurred. For a complete disclosure of the operation of the item gates 40, 42 and the lamps 98, 100, reference should be made to U.S. Pat. No. 4,086,476 issued to R. J. King and assigned to the assignee of the present application.

The data signals received by the microprocessor 94 identify the merchandise item being scanned. This information is transmitted over bus 102 to the communication interface 104 which transfers the data over bus 106 to a remote processor 108. The processor 108 using this data retrieves the price of the item from a price look-up table (not shown) located within the processor and transmits the price of the item to the microprocessor 94 through the interface 104 and bus 102. The price of the item is then transmitted over bus 76, displayed in the customer digital display 32 and transmitted over bus 72 to the display 48 (FIG. 1) in the terminal 44. Power is supplied to the system by the power supply 114.

The scale 22 includes the load plate 26 (FIG. 1), the load cells 50 (FIG. 2), the microprocessor 60, the ROM memory unit 62 in which is stored the programs for zero balancing and calibrating the scale, and a digital circuit section 110 by which the programs and the memory unit 62 interface with the microprocessor 60.

When a scale operation is required, the operator will place the item to be weighed on the load plate 26 (FIG. 2) which transfers the load to the load cells 50. The cells 50 will output analog signals to the amplifier 54 (FIG. 2), the A/D converter 56 (FIGS. 2 and 3) and to the microprocessor 60. The microprocessor 60 computes the weight and actuates the digital display 32 to display the weight. The weight data is also transmitted over bus 112 to the communication interface 104 which transfers the data to the terminal 44 over bus 72. The terminal will obtain the price per pound data from the remote processor 108 through the interface 104 and computes the item price, prints the item price on the customer receipt, displays the item price in the terminal display 48 (FIG. 1) and transmits the item price to the scanner microprocessor 94 which displays the price in the customer digital display 32. The microprocessor 94 will operate the green lamp 100 and the tone generator 74 through the microprocessor 60 if the operation is a good weighing operation and the red lamp 98 if it is a bad weighing operation.

Figure 4:
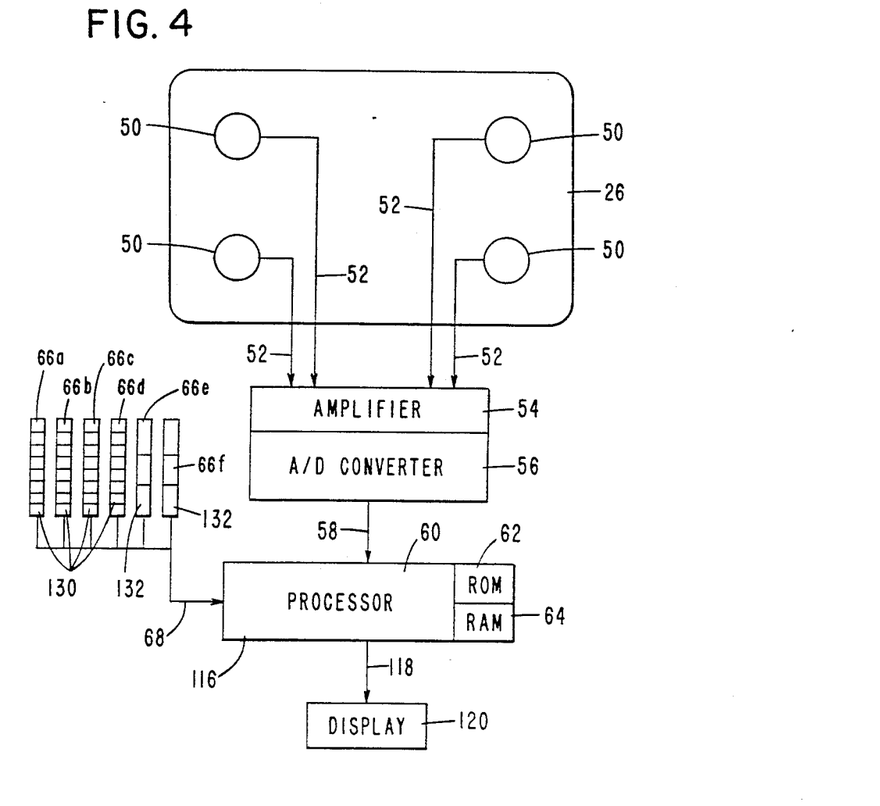
FIG. 4 is a schematic representation similar to that of FIG. 2 showing the system for calibrating a scale using an external processor.

Referring now to FIG. 4, there is disclosed a schematic representation of the system for calibrating the scale 22 at the time the scale is manufactured. As previously described with respect to FIG. 2, the scale includes the lid or load plate 26, the load cells 50, an analog amplifier 54, an A/D converter 56 and the bank of switches 66a–66f inclusive. The switches and the A/D converter 56 are connected by means of cables 68 and 58 respectively to a remote processor 116 which includes a ROM memory unit 62 in which is stored the calibration program and the RAM memory unit 64 in which data associated with the calibration procedure is stored. The processor 116 outputs data over line 118 to a display 120 for displaying instructions to the operator to set switches in the switch banks 66a–66d inclusive as will be described more fully hereinafter.

Figure 5:
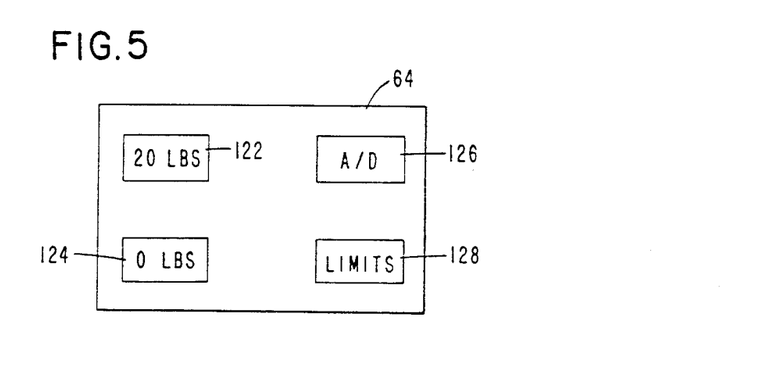
FIG. 5 is a block diagram of the RAM memory unit showing the memory locations of the storage registers associated with the calibrating procedure.

Referring now to FIG. 5, there is shown a schematic representation of the RAM memory unit 64 (FIGS. 2 and 4) showing the location of various storage registers used in the present method for calibrating the scale 22. Included in the memory unit 64 is a twenty pound storage register 122 in which is stored the previous reading of the A/D converter 56 (FIGS. 2 and 4) when twenty pounds is placed on the scale. In a similar manner, the previous reading of the output of the A/D converter when no weight is on the scale is stored in the register 124. The current output of the A/D converter 56 is stored in register 126. The register 128 has stored therein certain weight limits which are used by the microprocessor 60 (FIG. 2) or the processor 116 (FIG. 4) to qualify the output readings of the A/D converter as will be described more fully hereinafter.

Figure 8:
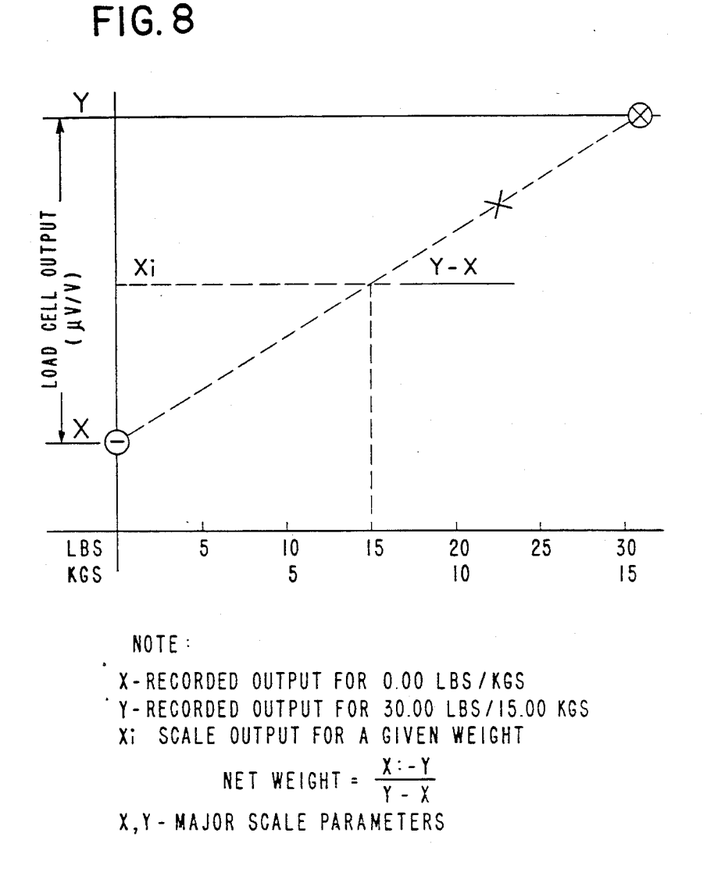
FIG. 8 is a schematic of a graph illustrating the output of the load cells of the scale in accordance with the weight placed on the scale.
Figures 9, 10A:
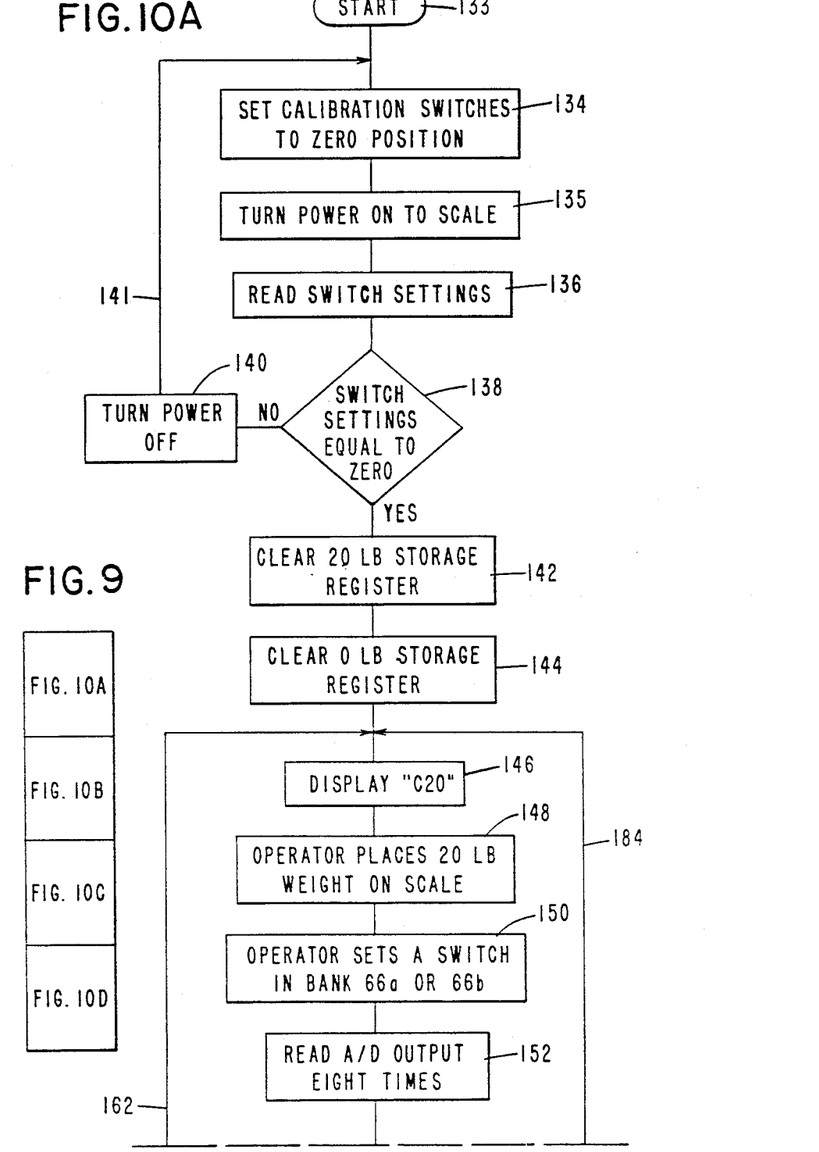
FIG. 9 is a diagram showing how FIGS. 10A–10D inclusive are assembled.
FIGS. 10A–10D inclusive are flow charts illustrating diagrammatically the steps of the calibrating procedure of the present invention.

Referring now to FIG. 8, there is shown a schematic of a graph illustrating the output of the load cells 50 in accordance with the weight positioned on the scale lid 26. As shown in the figure, there is a straight line relationship between the weight applied and the load cell output in microvolts/volt. As will be disclosed more fully hereinafter, the voltage output signals of the load cells 50 (FIGS. 2 and 4) are converted to binary data signals by the A/D converter 56. The converter 56 transmits the digital data signals to the microprocessor 60 (FIG. 2) when the calibration procedure occurs at the point of installation and the processor 116 (FIG. 4) when the calibration takes place at the completion of the scale assembly. The digital data signals are used by the processors 68 and 116 to establish the voltage output of the load cells when two weights conditions such as twenty pounds or zero pounds are applied to the scale. The corresponding digital values are then set up in the bank of switches 66a–66d inclusive. Each bank of switches 66a–66d inclusive comprise eight individual switches 130 in which each switch is movable between two positions. One position will represent a binary one and the other position a binary zero. The banks of switches 66a and 66b when set will represent a sixteen binary bit value representing the digital equivalent of the voltage output of the load cells 50 when twenty pounds is positioned on the scale 22. In a similar manner, the switch banks 66c and 66d when set will represent the voltage output of the load cells when no weight is placed on a scale. Switch banks 66e and 66f contain switches 132 which are used to select features of the scale such as selecting whether the display 32 will display pounds or kilograms. While the weights used in the present example are 20 lbs. and 0 lbs., any other two weight such as 30 lbs. and 15 lbs. may be used in the calibration procedure.

Referring to FIGS. 10A–10D inclusive, there is disclosed a flow chart diagrammatically illustrating the steps of the calibration procedure of the present invention. At the start of the calibration operation, (block 133) (FIG. 10A), the operator will set all the switches 130 in the switch banks 66a–66d inclusive to a zero position (block 134) and then turn on the power to the scale (block 135). The processors 116 (FIG. 4) or 60 (FIG. 2) in response to the turning on of the power to the scale will read the switch settings (block 136) to determine if the switch settings are in the zero position (block 138). If the switch settings are not in the zero position, the processor will go into a normal weighing operation and display zero pounds, notifying the operator to turn off the power to the scale (block 140) and return over path 141 to set the switches to a zero position (block 134). If the processor finds that the switch settings are all in a zero position, the processor will clear the twenty pound storage register 122 (FIG. 5) in the RAM memory unit 64 (block 142), clear the zero pound storage register 124 (block 144), display the "C20 lbs." logo 35 (FIG. 6) in the display 120 (FIG. 4) or 32 (FIG. 2) (block 146) which instructs the operator to put on a twenty pound weight on the scale (block 148). The operator, after putting on the twenty pound weight, will switch (block 150) one of the switches 130 in the banks of switches 66a or 66b (FIGS. 2 and 4) which notifies the processor that a twenty pound weight has been placed on the scale.

Figure 10B:
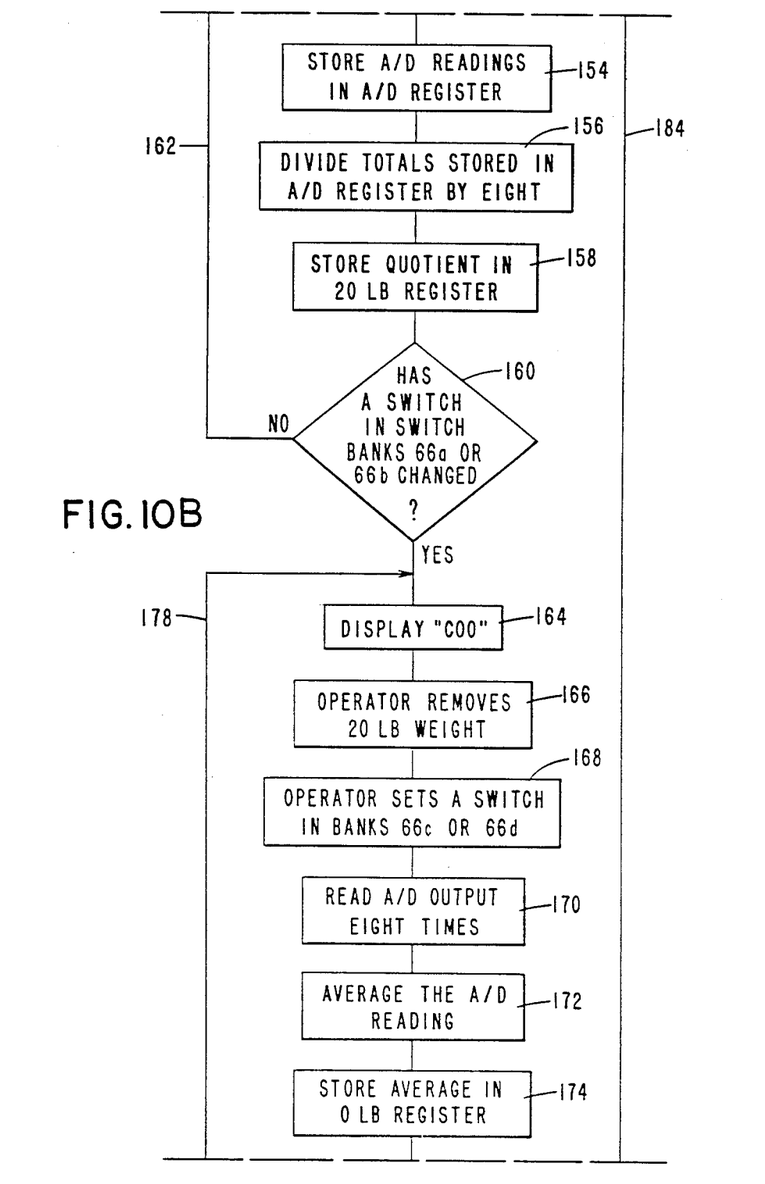

The processor then reads the output of the A/D converter 56 eight times (block 152) after displaying the "C20 lbs." logo 35 and stores the outputs in the A/D register 126 (FIG. 5) (block 154) (FIG. 10B). The processor will take the sum of the readings stored in the register 126 and divide that sum by eight (FIG. 1) (block 156). The resulting quotient representing the average output reading of the A/D converter with respect to a twenty pound weight is stored in (block 158) the twenty pound register 122 (FIG. 5). The processor at this time will monitor the switches in the switch banks 66a and 66b (block 160) to see if any of the switches have been changed. If a switch has not been changed, the processor will return over path 162 and display the "C20 lbs." logo 35 (block 146) on the display 32 (FIG. 1) and repeat the steps as set out in blocks 148–158 inclusive until the operator sets one of the switches 130 in the switch bank 66a or 66b.

If a switch in one of the banks 66a or 66b has been changed, the processor will display the "C00 lbs." logo 37 (FIG. 7) in the display 120 (FIG. 4) (block 164). In response to the displaying of the logo, the operator removes the twenty pound weight (block 166) and operates one of the switches in banks 66c or 66d (block 168). The processor reads the output of the A/D converter 56 eight times (block 170) after displaying the "C00 lbs." logo 37. The processor averages the readings of the A/D converter in the manner previously described (block 172) and stores the average in the zero pound storage register 124 (FIG. 5) (block 174). The processor then checks the switches in the switch banks 66c or 66d (block 176) (FIG. 10C) to see if a switch has been changed. If one of those switches has not been changed, the processor returns over path 178 and again displays the "C00 lbs." logo (block 164) and repeats the steps until a switch is detected to have been changed by the operator.

Figure 10C:
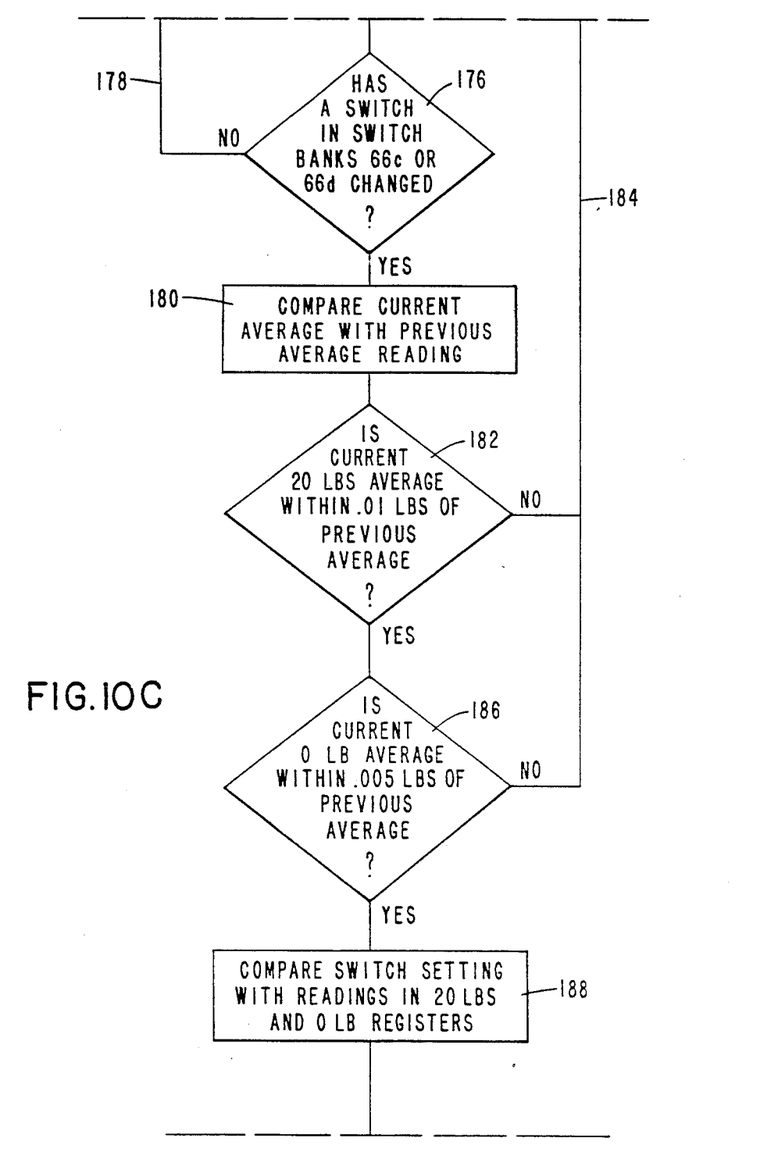
Figure 10D:
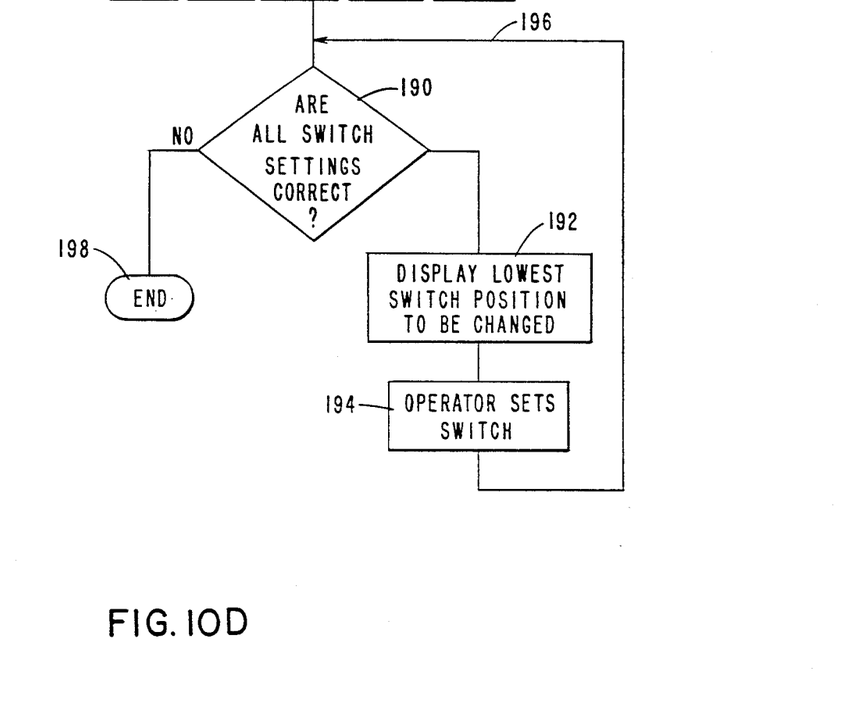

The processor then compares the twenty pound reading currently stored in the register 126 (FIG. 5) with a limit value stored in the register 128 (block 180). The processor then checks (block 182) to see if the twenty pound reading stored in the register 122 (FIG. 5) is within the limit of 0.01 lbs. of the previous reading stored in the register 122. Since the register 122 was initially cleared, the new average reading is not within the 0.01 lb. limit and the processor will repeat the procedure over path 184 until an average reading is established which is within 0.01 lbs. of the previous average reading. When this occurs the processor will then compare (block 186) the current average reading in the zero pound register 124 with the previous reading and repeat the above described procedure until a current average reading is established which is within 0.005 lbs. of the previous average reading for a zero weight condition (block 186).

With the twenty pound register 122 containing a digital reading which represents the output of the A/D converter 56 (FIG. 2) for the calibrated weight of a twenty pound weight and the zero pound register 124 containing a reading corresponding to the digital output of the A/D converter 56 (FIG. 2) for the calibrated zero pound weight, the processor will then examine the switch settings in the switch banks 66a-66d inclusive (FIGS. 2 and 4). As previously disclosed, the sixteen switches 130 (FIG. 2) in the switch bank 66a and 66b will store a 16 bit binary value in accordance with their settings with each switch setting representing a binary bit. The processor will compare (block 188) each of these switch settings with a corresponding bit in the binary value stored in the registers 122 and 124 (FIG. 5). At this time, the switch settings are in a zero position. This process will be repeated for each of the sixteen switches 130 in the switch banks 66a and 66b corresponding to the binary value stored in the twenty pound storage register 122. In a similar manner, the switch settings of the switches 130 in the switch banks 66c and 66d will be compared to the zero pound digital value stored in the storage register 124. The processor will check (block 190) to see if all of the switch settings are set correctly. If they are not, the processor will then display on the display 32 (FIG. 2) or 120 (FIG. 4) the setting of the lowest switch in the switch banks 66a and 66b which has to be changed to represent the binary value corresponding to the calibrated twenty pound weight (block 192) stored in register 122. Those switches which are required to be set will be displayed one at a time. In response to the displaying of each of the switch settings, the operator (block 194) will set the switches in the manner designated on the display. Thus for example, if the fourth switch in switch bank 66a is to be switched from its present position, the operator will just flip the switch accordingly. A switch which has to be changed will be identified on the display. In a similar manner, the processor will display the switch settings of the switches in the switch banks 66c and 66d representing the digital value corresponding to a calibrated zero weight condition of the scale. In response to the displaying of the switch settings, the operator will set the switches in the same manner as described above. The processor will again, over path 196, check all the switch settings (block 190) to see if they are set correctly. This cycle is repeated until all the switches are set correctly, at which time the processor will then end the calibration procedure (block 198). It will thus be seen that the present invention provides a very simple and foolproof method of calibrating the scale. The method of calibrating the scale as set out in the application requires that the operator have very little training and no knowledge of the actual procedure in the calibrating of the scale.

While the salient features of the invention have been illustrated and described, it should be readily apparent to those skilled in the art that many changes and modifications can be made in the invention presented without departing from the spirit and true scope of the invention. Accordingly, the present invention should be considered as encompassing all such changes and modifications of the invention that fall within the broad scope of the invention as defined by the appended claims.

We claim:

1. In a system for weighing a weighted object including a scale for outputting digital signals representing the weight of the object, a processor connected to the scale, first and second sets of settable switches in which the switches are manually settable by the operator to a first or second position representing the binary bit of a digital value and a display connected to the processor, a method for calibrating the scale comprising the steps of:
   manually setting the first set of settable switches to a first position;
   applying power to the system;
   displaying instructions by the processor on the display for the operator to place a weighted object on the scale;
   manually placing the weighted object on the scale to put the scale in a first weighted condition;
   performing a first sampling operation of the output of the scale by the processor to generate first digital signals representing the weight of the weighted object;
   comparing the first digital signals with the setting of the first set of settable switches;
   displaying instructions by the processor on the display identifying the settings of the first set of settable switches to represent the first digital signals; and
   manually setting the first set of switches in accordance with the instructions displayed.

2. The method of claim 1, also including the step of operating one of the first settable switches after placing the first weighted object on the scale identifying that the first weighted object has been placed on the scale.

3. The method of claim 1 in which the step of displaying instructions on the display identifying the settings of the first set of settable switches includes the step of assigning a position to each of the first settable switches from highest to lowest and displaying the lowest switch position that is to be changed.

4. The method of claim 1 in which the step of sampling further includes the steps of:
   performing a plurality of second sampling operations of the output of the scale;
   summing the first digital signals sampled;
   dividing the sum by the number of second samplings peformed to obtain a first average of the first digital signals representing the weight of the weighted object; and
   storing the first average of the first digital signals.

5. The method of claim 4, also including the steps of:
   performing a plurality of third sampling operations of the output of the scale;
   summing the first digital signals sampled in said third sampling operations;
   dividing the sum by the number of third sampling operations performed to obtain a second average of the first digital signals representing the weight of the weighted object;
   comparing the second average of the first digital signals with the first average to determine whether said compared second average is similar to said first average by less than a first predetermined weight; and
   comparing the second average of the first digital signals with the settings in the first set of settable switches when said second average is similar to said first average by less than said first predetermined weight.

6. The method of claim 5 in which the weight of the weighted object is twenty lbs.

7. The method of claim 2, also including the steps of:
   display instructions by the processor to the operator to remove the weighted object from the scale thereby placing the scale in a second weighted condition in response to the operation of one of said first settable switches;

performing a second sampling operation of the output of the scale to generate second digital signals representing the weight of the second weighted condition of the scale;

comparing the second digital signals with the setting of the second set of settable switches;

displaying instructions by the processor on the display identifying the settings of the second set of settable switches to represent the second digital signals; and manually setting the second set of settable switches in accordance with the instructions displayed on the display.

8. The method of claim 7, also including the step of manually operating one of the second settable switches after placing the scale in the second weighted condition.

9. The method of claim 8 in which the step of sampling further includes the steps of:

performing a plurality of third sampling operations of the output of the scale;

summing the second digital signals sampled;

dividing the sum by the number of third samplings performed to obtain a first average of the second digital signals representing the second weighed condition of the scale; and storing the first average of the second digital signals.

10. The method of claim 9, also including the steps of:

performing a plurality of fourth sampling operations of the output of the scale;

summing the second digital signals sampled;

dividing the sum by the number of fourth samplings performed to obtain a second average of the second digital signals representing the second weighted condition of the scale;

comparing the second average of the second digital signals with the first average to determine whether said compared second average is similar to said first average by less than a first predetermined weight; and comparing the second average of the second digital signals with the settings in the second set of settable switches when said second average is similar to said first average by less than said first predetermined weight.

11. The method of claim 10 in which the second weighted condition of the scale is zero lbs.

12. In a system for weighing a weighted merchandise item, including a scale for outputting digital signals representing the weight of the merchandise item placed on the scale, a processor connected to the scale, first and second sets of settable switches in which the switches are settable to a first or second position representing the binary bit of a digital value and a display connected to the processor, a method for calibrating the scale comprising the steps of:

manually setting the first and second set of settable switches to a first position;

applying power to the system;

displaying instructions by the processor for the operator to place a weighted object on the scale;

manually setting a switch in said set of first settable switches;

sampling the output of the scale a first number of times to generate first digital signals representing the the weight of the weighted object;

summing the first digital signals sampled;

dividing the sum by the first number of times the scale output was sampled to obtain the first average of the first digital signals representing the weight of the weighted object;

storing the first average of the first digital signals;

sensing the first set of settable switches to see if a switch has been operated;

displaying instructions by the processor to remove the weighted object from the scale placing the scale in a second weighted condition in response to the processor sensing that a switch in said first settable switches has been operated;

manually operating a switch in said second set of settable switches;

sampling the output of the scale a second number of times to identify second digital signals representing the weight of the second weighted object;

summing the second digital signals sampled;

dividing the sum by the second number of times the scale output was sampled to obtain a first average of the second digital signals representing the weight of the second weighted object;

repeating the sampling of the output of the scale when the first and second objects have been placed on the scale to obtain a second average of the first and second digital signals representing the weight of the first and second weighted conditions of the scale respectively;

comparing the second average of the first and second digital signals with the corresponding first average of the first and second digital signals to determine whether said compared second average is similar to the first average by less than a first predetermined weight;

comparing the second average of the first and second digital signals with the settings of the first and second set of settable switches respectively when said second average is similar to said first average by less than said first predetermined weight;

displaying instructions by the processor on the display identifying the settings of the first and second set of settable switches to represent the second average of the first and second digital signals respectively;

and manually setting the first and second set of settable switches in accordance with the instructions displayed on a display.

13. The method of claim 12 in which the step of displaying instructions on the display identifying the settings of the first and second set of settable switches includes the step of assigning a position to each of the switches in the first and second set of settable switches from highest to lowest and displaying the lowest switch position of each of the switches that is to be changed.

* * * * *

UNITED STATES PATENT AND TRADEMARK OFFICE
CERTIFICATE OF CORRECTION

PATENT NO. : 4,760,539

DATED : July 26, 1988

INVENTOR(S) : Gene L. Amacher et al.

It is certified that error appears in the above-identified patent and that said Letters Patent is hereby corrected as shown below:

Column 8, line 26, before the word "operating" insert --manually--.

Column 8, line 26, after the word "after" insert --manually--.

Column 8, line 27, delete "first".

Column 8, line 28, delete "first".

Column 8, line 41, delete "peformed" and substitute --performed--.

Column 8, line 67, delete "display" and substitute --displaying--.

Column 10, line 44, delete "settings" and substitute --setting--.

Signed and Sealed this

Sixth Day of December, 1988

Attest:

DONALD J. QUIGG

*Attesting Officer*  *Commissioner of Patents and Trademarks*